(12) United States Patent
Heo et al.

(10) Patent No.: US 8,937,472 B2
(45) Date of Patent: Jan. 20, 2015

(54) DC-DC CONVERTER CAPABLE OF CONFIGURING TOPOLOGY

(75) Inventors: Sewan Heo, Daejeon (KR); Yil Suk Yang, Daejeon (KR); Jong Kee Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 409 days.

(21) Appl. No.: 13/541,108

(22) Filed: Jul. 3, 2012

(65) Prior Publication Data

US 2013/0033241 A1 Feb. 7, 2013

(30) Foreign Application Priority Data

Aug. 2, 2011 (KR) .................. 10-2011-0076873

(51) Int. Cl.
*H02M 3/158* (2006.01)

(52) U.S. Cl.
CPC .................................. *H02M 3/1582* (2013.01)
USPC .......................................... 323/351; 323/222

(58) Field of Classification Search
USPC ............................ 323/222, 225, 271, 282, 351
See application file for complete search history.

(56) References Cited

U.S. PATENT DOCUMENTS

| | | | |
|---|---|---|---|
| 7,298,119 B1 * | 11/2007 | Amram Summit et al. | 323/225 |
| 7,768,214 B2 | 8/2010 | Doi et al. | |
| 7,804,282 B2 * | 9/2010 | Bertele | 323/222 |
| 8,138,744 B2 * | 3/2012 | Nagano et al. | 323/350 |
| 8,269,471 B2 * | 9/2012 | Singnurkar | 323/259 |
| 8,791,672 B2 * | 7/2014 | Klein et al. | 323/222 |
| 2006/0176037 A1 * | 8/2006 | Flatness et al. | 323/282 |
| 2008/0001587 A1 * | 1/2008 | Cremoux | 323/282 |
| 2008/0079405 A1 * | 4/2008 | Shimizu | 323/282 |
| 2010/0207455 A1 * | 8/2010 | Erickson et al. | 307/82 |
| 2011/0140536 A1 * | 6/2011 | Adest et al. | 307/82 |
| 2011/0149610 A1 | 6/2011 | Moussaoui et al. | |
| 2011/0156683 A1 | 6/2011 | Zhang et al. | |
| 2012/0206118 A1 * | 8/2012 | Williams | 323/282 |
| 2013/0033241 A1 * | 2/2013 | Heo et al. | 323/265 |
| 2014/0077870 A1 * | 3/2014 | Liu et al. | 327/540 |

* cited by examiner

*Primary Examiner* — Jeffrey Sterrett

(74) *Attorney, Agent, or Firm* — Rabin & Berdo, P.C.

(57) ABSTRACT

Disclosed is a DC-DC converter including: a switch unit controlling a flow of a current based on a buck-boost topology; a short circuit unit short circuited or opened according to an external setting to change a topology of the switch unit; an inductor storing a current induced by the switch unit; a topology selecting unit selecting a topology in response to an external input signal and generating a signal corresponding to the selected topology; a pulse width modulating unit generating a signal for determining an operation time of the switch unit; a reverse flow detecting unit detecting a reverse flow of a current flowing through the switch unit to generate a signal; and a switch control unit controlling the switch unit in response to signals of the topology selecting unit, the pulse width modulating unit and the reverse flow detecting unit.

12 Claims, 6 Drawing Sheets

DC-DC CONVERTER CAPABLE OF CONFIGURING TOPOLOGY

CROSS-REFERENCE TO RELATED APPLICATIONS

This application is based on and claims priority from Korean Patent Application No. 10-2011-0076873, filed on Aug. 2, 2011, with the Korean Intellectual Property Office, the disclosure of which is incorporated herein in its entirety by reference.

TECHNICAL FIELD

The present disclosure a DC-DC converter, and more particularly, to a DC-DC converter changes the topology not only to a basic topology but also to a buck topology or a boost topology according to a relationship of an input voltage and an output voltage in a DC-DC converter IC realized by a buck-boost topology, thereby not lowering efficiency as compared with a DC-DC converter IC realized by a single buck topology or a single boost topology.

BACKGROUND

As an apparatus for supplying electric power, a DC-DC converter is a power supply apparatus which generally widely is used. The DC-DC converter can not only change a specific input voltage to a desired voltage but also supply a constant output voltage without being influenced by a change in input voltage, and supply a constant voltage regardless of a magnitude of a load of an output.

One of the most important factors representing performance of a DC-DC converter is conversion efficiency. Here, the conversion efficiency is a ratio of an electric power finally transferred to an output to an input electric power. In this case, as electric power is lost or used in various forms during a process of outputting an electric power obtained from an input, it is a better way to reduce the lost or used electric power in order to increase conversion efficiency.

Meanwhile, one of the most important factors representing a structure of a DC-DC converter is a topology. Topologies are largely classified into a buck topology, a boost topology, and a buck-boost topology. The buck topology is also called a step down, and is used when an output voltage is low as compared with an input voltage. Meanwhile, the boost topology is also called a step up, and is used when an output voltage is high as compared with an input voltage. However, since a relationship between the magnitudes of an input voltage and an output voltage is reversed in the buck-boost topology, a boost topology cannot be used in an input/output voltage condition where a buck topology is used, whereas a buck topology cannot be used in an input/output voltage condition where a boost topology is used.

In order to solve this problem, there exists a buck-boost topology called a step up-down. The buck-boost topology has structural advantages of the buck topology and the boost topology, and may be used regardless of a relationship of the magnitudes between the input/output voltages. There are various methods to realize the buck-boost topology. There is most basically a method of directly connecting the buck topology and the boost topology. However, in the above-mentioned structure, conversion efficiency lowers as electric power loss is increased by a transistor.

According to the related art, a DC-DC converter IC may be selected to be used according to magnitudes of input/output voltages, but the DC-DC converter needs to be changed if a relationship in the magnitudes between the input/output voltages is changed, or a board including the DC-DC converter IC even needs to be changed. Thus, a DC-DC converter including one DC-DC converter IC operated regardless of a relationship between magnitudes of input/output voltages while maintaining high efficiency is required.

SUMMARY

The present disclosure has been made in an effort to provide a DC-DC converter which can change a topology thereof to various topologies according to input/output voltages in a DC-DC converter IC configured by a buck-boost topology while being operated at high efficiency.

An exemplary embodiment of the present disclosure provides a DC-DC converter including: a switch unit controlling a flow of a current based on a buck-boost topology; a short circuit unit short circuited or opened according to an external setting to change a topology of the switch unit; an inductor storing a current induced by the switch unit; a topology selecting unit selecting a topology in response to an external input signal and generating a signal corresponding to the selected topology; a pulse width modulating unit generating a signal for determining an operation time of the switch unit; a reverse flow detecting unit detecting a reverse flow of a current flowing through the switch unit to generate a signal; and a switch control unit controlling the switch unit in response to signals of the topology selecting unit, the pulse width modulating unit and the reverse flow detecting unit.

As described above, according to the exemplary embodiment of the present disclosure, various topologies can be configured according to a relationship in the magnitudes between input/output voltages without changing a used DC-DC converter IC and electric power of high efficiency and a constant voltage can be provided regardless of a change in the magnitudes of the input/output voltages, by providing a DC-DC converter capable of configuring a topology.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of the present disclosure will be described in detail with reference to the accompanying drawings. In a description of the present disclosure, a detailed description of related known configurations and functions will be omitted when it may make the gist of the present disclosure obscure.

Figure 1:
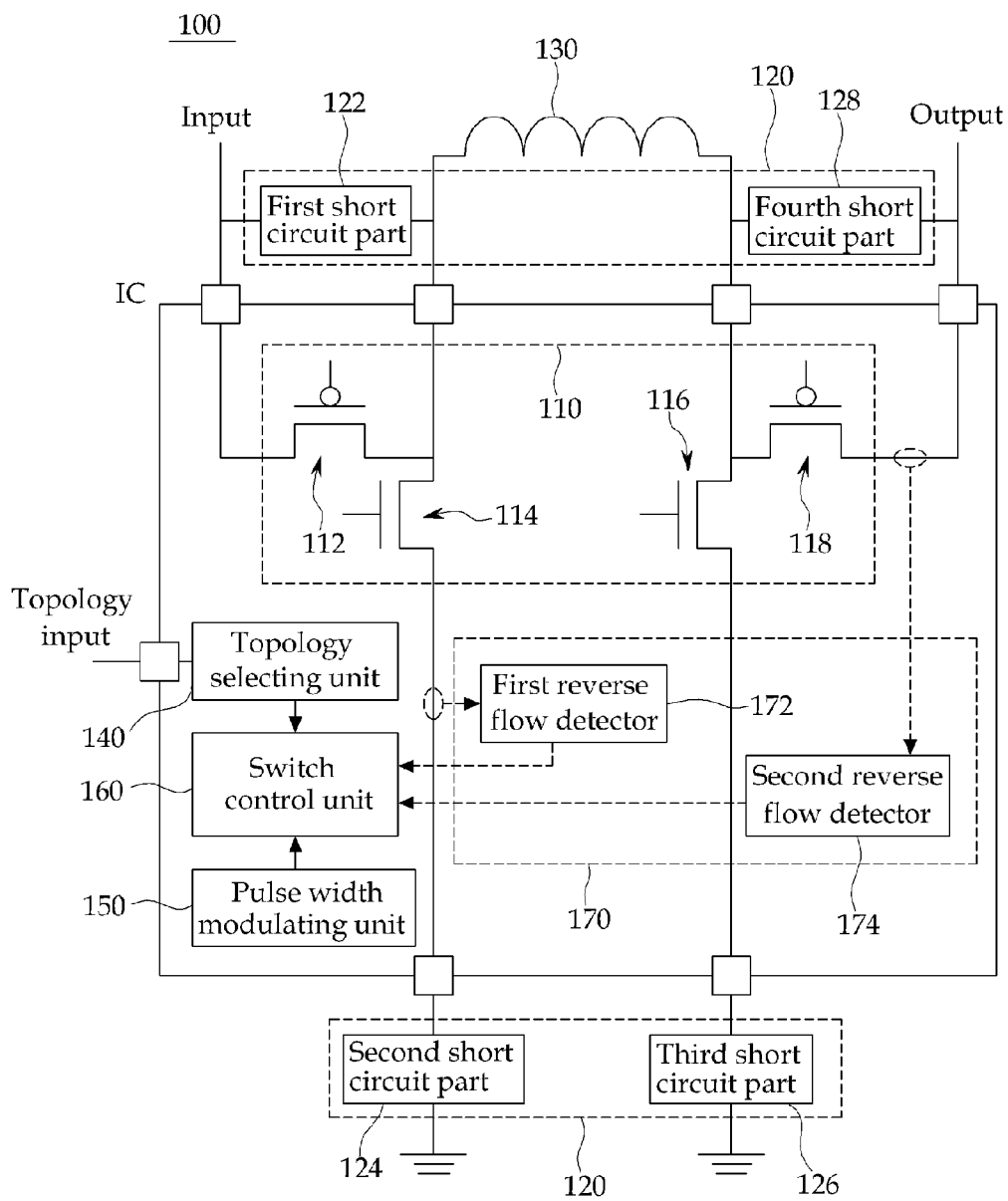
FIG. 1 is a diagram illustrating a configuration of a DC-DC converter capable of configuring a topology according to an exemplary embodiment of the present disclosure.

FIG. 1 is a diagram illustrating a configuration of a DC-DC converter capable of configuring a topology according to an exemplary embodiment of the present disclosure.

Referring to FIG. 1, the DC-DC converter 100 according to the exemplary embodiment of the present disclosure includes a switch unit 110, a short circuit unit 120, an inductor 130, a topology selecting unit 140, a pulse width modulating unit 150, a switch control unit 160 and a reverse flow detecting unit 170.

The switch unit 110 is configured by a buck-boost topology, and controls a flow of a current by using a plurality of switches. To this end, the switch unit 110 includes a first switch 112 one end of which is connected to an input and an opposite end of which is connected to the inductor 130, a second switch 114 one end of which is connected to the inductor 130 and an opposite end of which is connected to a second short circuit part 124, a third switch 116 one end of which is connected to the inductor 130 and an opposite end of which is connected to a third short circuit part 126 and a fourth switch 118 one end of which is connected to the inductor 130 and an opposite end of which is connected to an output. Here, the first to fourth switches 112, 114, 116 and 118 are transistors.

The switch unit 110 according to the exemplary embodiment of the present disclosure is configured by a buck-boost topology, but may be changed to a buck topology or a boost topology according to a configuration of the short circuit unit 120.

The short circuit unit 120 is short circuited or opened through external setting to change the topology of the switch unit 110. That is, if a first short circuit part 122 is short circuited, the switch unit 110 is changed to a boost topology, and if a fourth short circuit part 128 is short circuited, the switch unit 110 is changed to a buck topology. Then, the second short circuit part 124 and the third short circuit part 126 may be selectively opened or short circuited to reduce a leakage current. To this end, the first short circuit part 122 and the fourth short circuit part 128 are connected to the first switch 112 and the fourth switch 118 in parallel, respectively, and the second short circuit part 124 and the third short circuit part 126 are connected to the second switch 114 and the third switch 116 in series, respectively.

The inductor 130 serves to store a current induced by the switch unit 110.

The topology selecting unit 140 selects any one of a buck-boost topology, a buck topology and a boost topology according to an external topology input, and transmits a signal corresponding to the selected topology to the switch control unit 160.

The pulse width modulating unit 150 generates a signal for determining an on/off operation time of the switch unit 110 to maintain an output voltage at a desired voltage.

The switch control unit 160 controls the switch unit 110 such that the DC-DC converter may be operated based on a topology selected by the topology selecting unit 140 in response to signals of the topology selecting unit 140 and the pulse width modulating unit 150.

The switch control unit 160 may control the switch unit 110 in response to a signal of the reverse flow detecting unit 170 in order to prevent a current induced in the inductor 130 from being reversely flowed.

The reverse flow detecting unit 170 is required in the case of a discontinuous conduction mode that a current induced in the inductor 130 temporarily has a value of 0 in the process of transferring a current induced in the inductor 130 as an output. Then, the reverse flow detecting unit 170 detects a reverse flow of a current flowing through the switch unit 110 in order to prevent a current induced in the inductor 130 from being reversely. In detail, when the switch unit 110 is configured by a boost topology, the second reverse flow detector 174 detects a reverse flow of a current flowing through the fourth switch 118, and when the switch unit 110 is configured by a buck topology, the first reverse flow detector 172 detects a reverse flow of a current flowing through the second switch 114. In addition, when the switch unit 110 is configured by a buck-boost topology, any one of the first reverse flow detector 172 and the second reverse flow detector 174 is operated to detect a reverse flow of a current flowing through the second switch 114 or the fourth switch 118.

Figure 2:
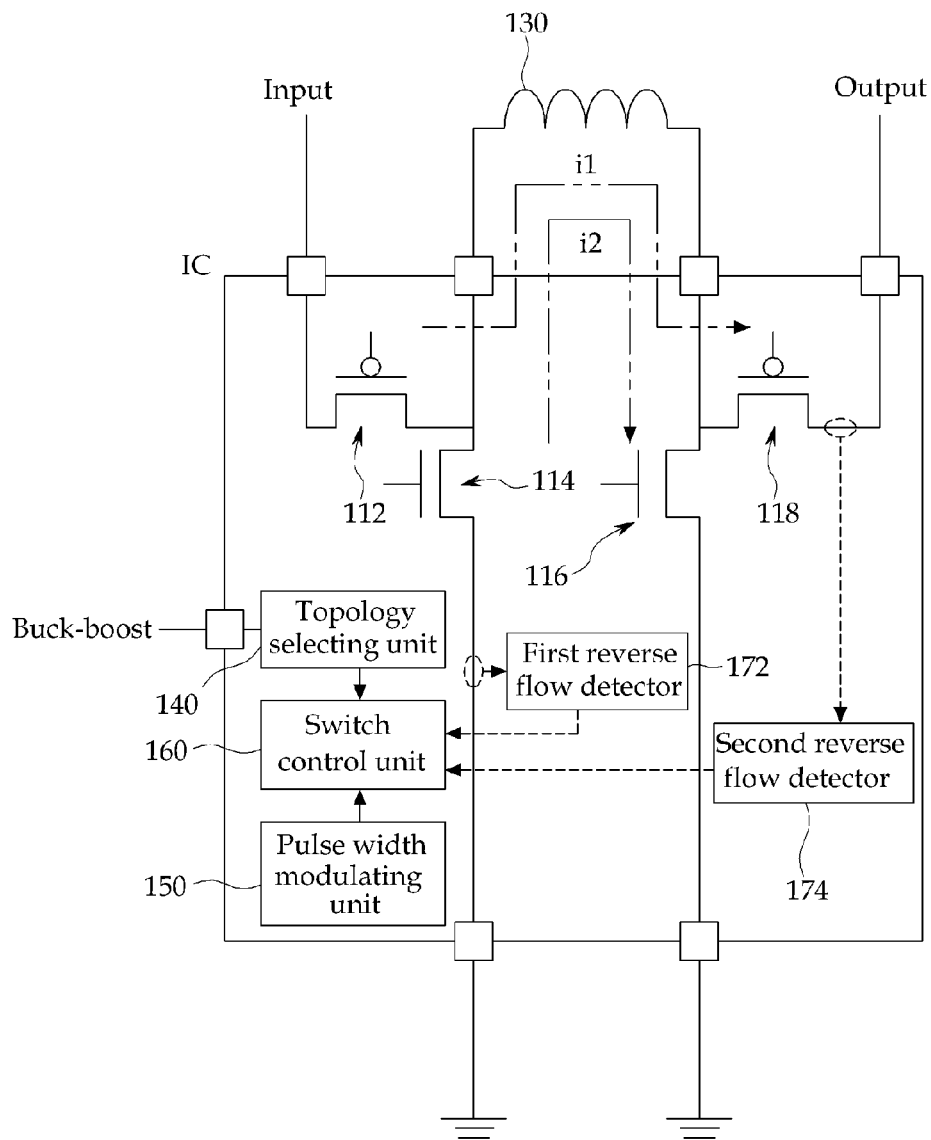
FIG. 2 is a diagram for describing a buck-boost topology operation of the DC-DC converter capable of configuring a topology according to the exemplary embodiment of the present disclosure.

FIG. 2 is a diagram for describing a buck-boost topology operation of the DC-DC converter capable of configuring a topology according to the exemplary embodiment of the present disclosure.

Referring to FIG. 2, the DC-DC converter 100 according to the exemplary embodiment of the present disclosure is operated in a buck-boost topology, as the first short circuit part 122 and the fourth short circuit part 128 are opened and the second short circuit part 124 and the third short circuit part 126 are short circuited.

First, as the first switch 112 and the third switch 116 are simultaneously opened by the switch control unit 160, a current of i1 flows through the inductor 130, and as the first switch 112 and the third switch 116 are closed and the second switch 114 and the fourth switch 118 are opened at the same time, a current of i2 flows through the inductor 130. In this case, when a current of the inductor 130 becomes 0, any one of the first reverse flow detector 172 and the second reverse flow detector 174 transmits a signal to the switch control unit 160 so that the switch control unit 160 closes any one of the second switch 114 and the fourth switch 118 to prevents a reverse flow of a current.

Figure 3:
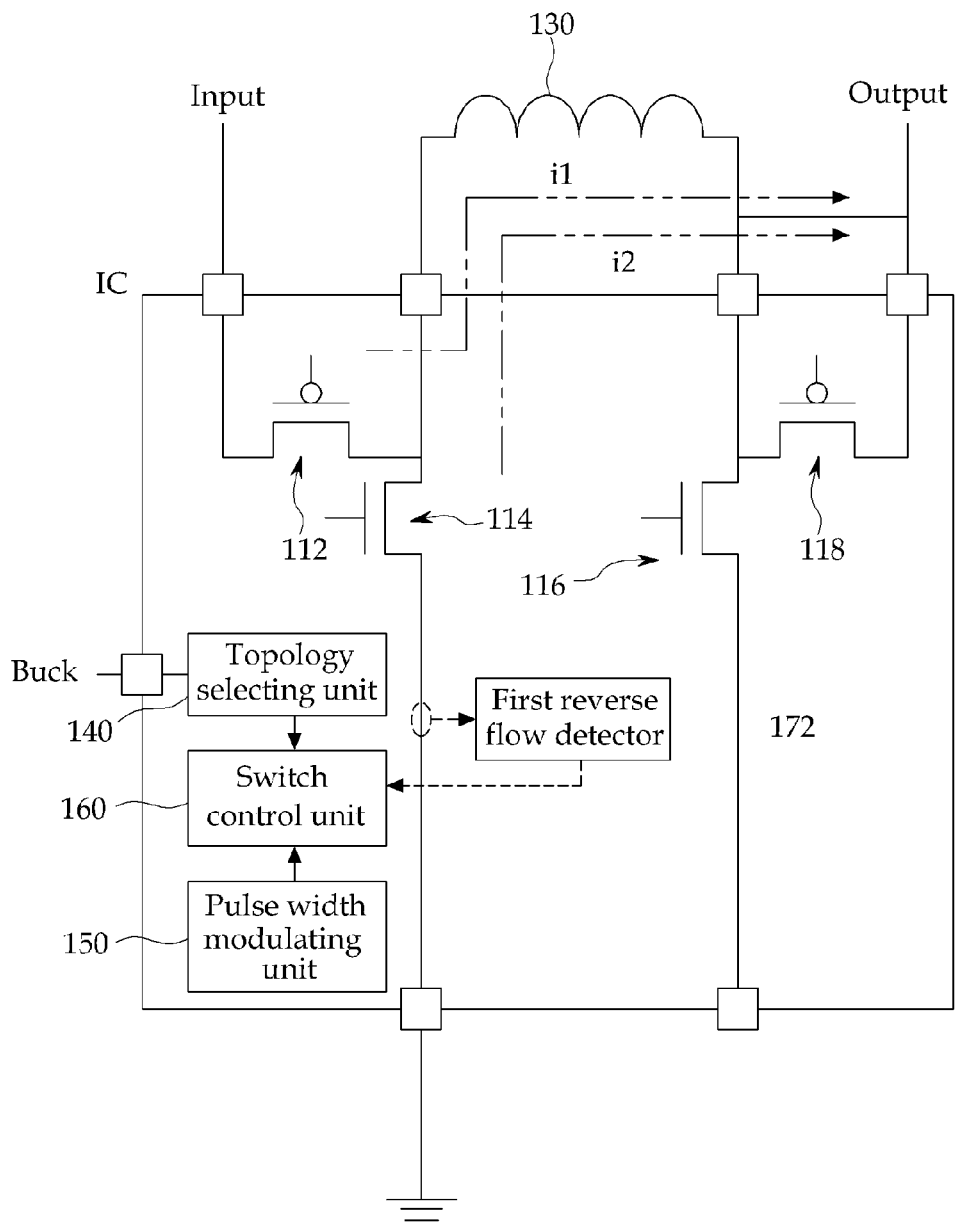
FIG. 3 is a diagram for describing a buck topology operation of the DC-DC converter capable of configuring a topology according to the exemplary embodiment of the present disclosure.

FIG. 3 is a diagram for describing a buck topology operation of the DC-DC converter capable of configuring a topology according to the exemplary embodiment of the present disclosure.

Referring to FIG. 3, the DC-DC converter 100 according to the exemplary embodiment of the present disclosure is operated in a buck topology as the first short circuit part 122 and the third short circuit part 126 are opened and the second short circuit part 124 and the fourth short circuit part 128 are short circuited.

First, as the first switch 112 is opened by the switch control unit 160, a current of i1 flows through the inductor 130, and as the first switch 112 is closed and the second switch 114 is operated at the same time, a current of i2 flows through the inductor 130. Here, the third switch 116 and the fourth switch 118 are opened or closed regardless of an operation of the DC-DC converter. In this case, when a current of the inductor 130 becomes 0, the first reverse flow detector 172 transmits a signal to the switch control unit 160 so that the switch control unit 160 closes the second switch 114 to prevents a reverse flow of a current.

The DC-DC converter 100 according to the exemplary embodiment of the present disclosure may be operated in a buck topology when the third switch 116 remains turned off even if the third short circuit part 126 is not opened but short circuited. However, since a leakage current may occur in the turned off third switch 116, the third short circuit part 126 is more preferably opened.

The DC-DC converter 100 according to the exemplary embodiment of the present disclosure may be operated in a buck topology when the fourth switch 118 remains turned on even if the fourth short circuit part 128 is not short circuited but opened. However, since a loss of electric power is generated by an internal resistance of the fourth switch 118 while currents of i1 and i2 flow through the fourth switch 118, a current preferably flows not through the fourth switch 118 but through the fourth short circuit part 128 for high efficiency.

Figure 4:
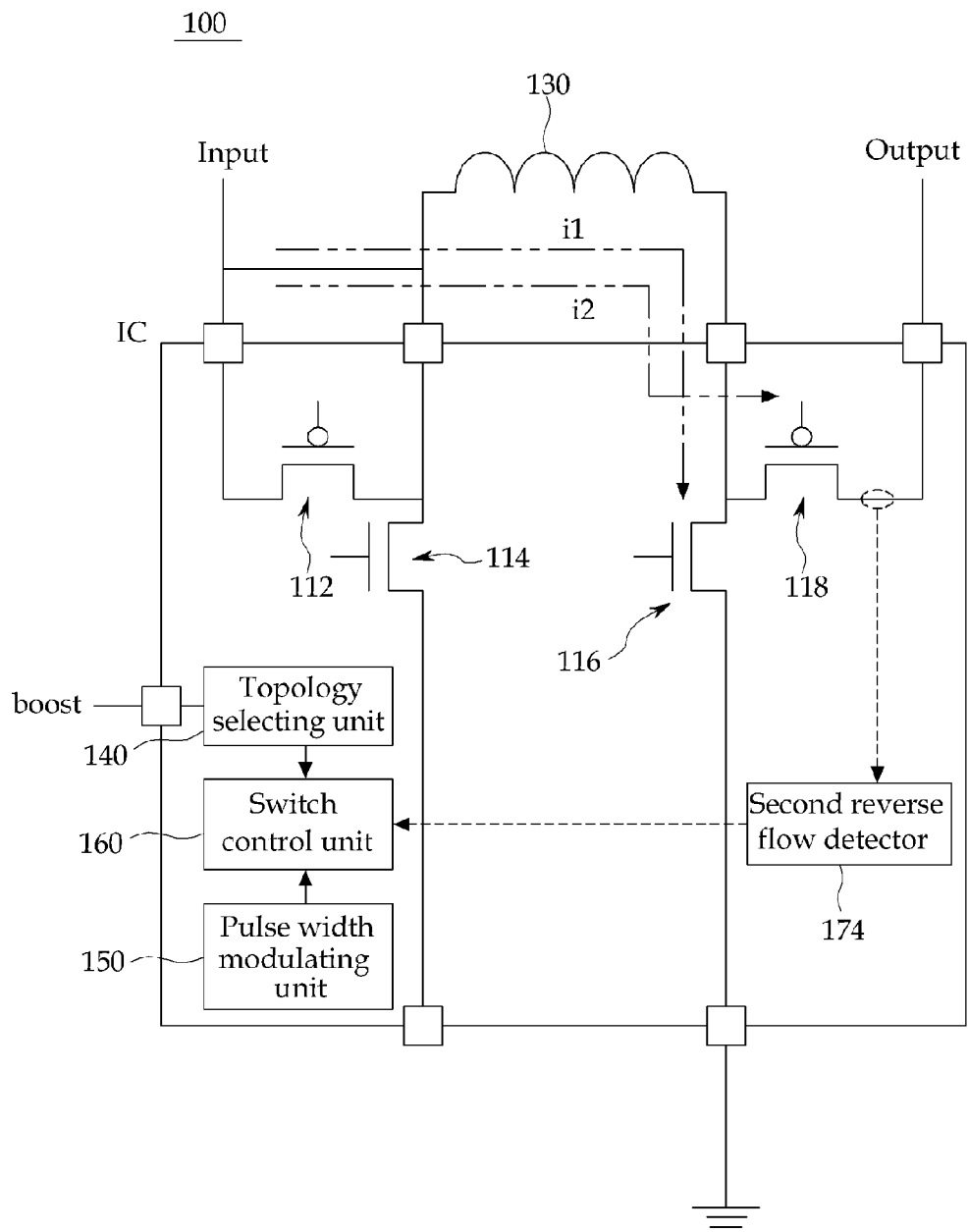
FIG. 4 is a diagram for describing a boost topology operation of the DC-DC converter capable of configuring a topology according to the exemplary embodiment of the present disclosure.

FIG. 4 is a diagram for describing a boost topology operation of the DC-DC converter capable of configuring a topology according to the exemplary embodiment of the present disclosure.

Referring to FIG. 4, the DC-DC converter 100 according to the exemplary embodiment of the present disclosure is operated in a boost topology as the first short circuit part 122 and the third short circuit part 126 are short circuited and the second short circuit part 124 and the fourth short circuit part 128 are opened.

First, as the third switch 116 is opened by the switch control unit 160, a current of i1 flows through the inductor 130, and as the third switch 116 is closed and the fourth switch 118 is opened at the same time, a current of i2 flows through the inductor 130. Here, the first switch 112 and the second switch 114 are opened or closed regardless of an operation of the DC-DC converter. In this case, when a current of the inductor 130 becomes 0, the second reverse flow detector 174 transmits a signal to the switch control unit 160 so that the switch control unit 160 closes the fourth switch 118 to prevents a reverse flow of a current.

The DC-DC converter 100 according to the present disclosure may be operated in a buck topology when the second switch 114 remains turned off even if the second short circuit part 124 is not opened but short circuited. However, since a leakage current may occur in the turned off second switch 114, the second short circuit part 124 is more preferably opened.

The DC-DC converter 100 according to the exemplary embodiment of the present disclosure may be operated in a buck topology when the first switch 112 remains turned on even if the first short circuit part 122 is not short circuited but opened. However, since a loss of electric power is generated by an internal resistance of the first switch 112 while currents of i1 and i2 flow through the first switch 112, a current preferably flows not through the first switch 112 but through the first short circuit part 122 for high efficiency.

Figure 5A:
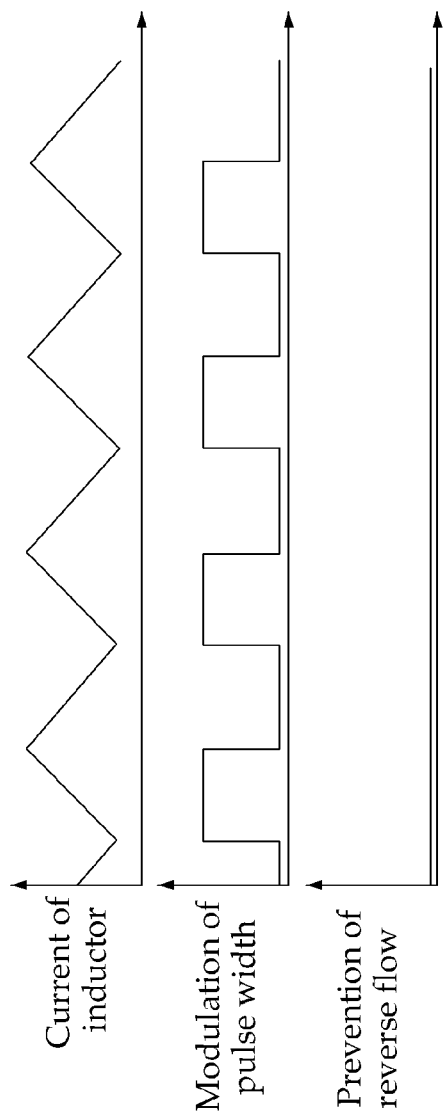
FIGS. 5A and 5B are a graph illustrating a relationship between a current of an inductor and a reverse flow preventing signal according to a mode.
Figure 5B:
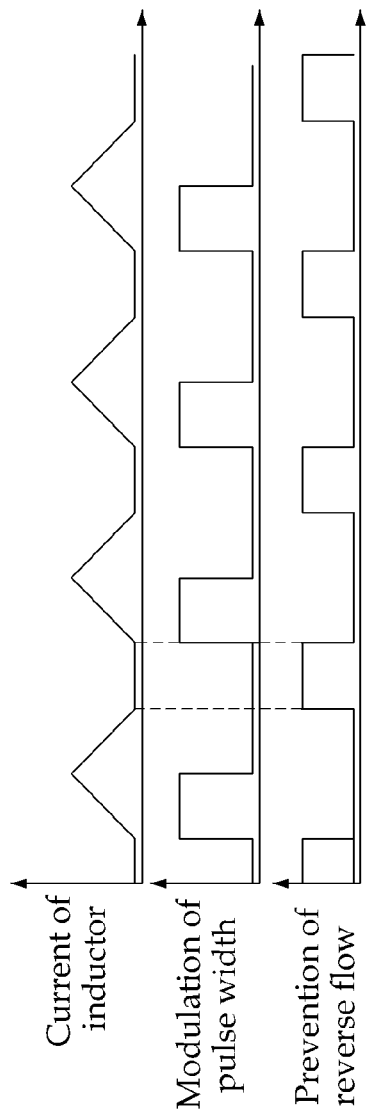

FIGS. 5A and 5B are a graph illustrating a relationship between a current of an inductor and a reverse flow preventing signal according to a mode.

As illustrated in FIG. 5A, in a continuous conduction mode, a point where a magnitude of a current becomes zero, that is, a situation where a current is reversed does not occur in a process of increasing or decreasing a current (induction current) of the inductor 130 in response to a signal (pulse width modulating signal) of the pulse width modulating unit 150 for constantly maintain an output voltage. Thus, the reverse flow detecting unit 170 does not need to be operated.

However, as illustrated in FIG. 5B, in a discontinuous conduction mode, a reverse flow needs to be interrupted by necessarily controlling the switch unit 110 through a signal (reverse flow preventing signal) of the reverse flow detecting unit 170 to close the corresponding switch, as a point where a current becomes zero occurs in a process of increasing or decreasing a current (induction current) of the inductor 130. Accordingly, an electric power of an output is prevented from being reversely leaked by preventing a current of the inductor 130 from being reversely flowed.

Thus, the exemplary embodiment of the present disclosure provides a DC-DC converter which can change the topology not only to a basic topology but also to a buck topology or a boost topology according to a relationship of an input voltage and an output voltage by using a DC-DC converter IC realized by a buck-boost topology, thereby achieving various topologies while not lowering efficiency as compared with a single topology IC.

The various embodiments disclosed herein are not intended to be limiting, with the true scope and spirit being indicated by the following claims. The scope of the present disclosure shall be construed by the following claims, and all technologies within a range equivalent to the scope of the present disclosure shall fall within the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A DC-DC converter comprising:
   a switch unit controlling a flow of a current based on a buck-boost topology;
   a short circuit unit short circuited or opened according to an external setting to change a topology of the switch unit;
   an inductor storing a current induced by the switch unit;
   a topology selecting unit selecting a topology in response to an external input signal and generating a signal corresponding to the selected topology;
   a pulse width modulating unit generating a signal for determining an operation time of the switch unit;
   a reverse flow detecting unit detecting a reverse flow of a current flowing through the switch unit to generate a signal; and
   a switch control unit controlling the switch unit in response to signals of the topology selecting unit, the pulse width modulating unit and the reverse flow detecting unit.

2. The DC-DC converter of claim 1, wherein the switch unit includes:
   a first switch one end of which is connected to an input and an opposite end of which is connected to the inductor;
   a second switch one end of which is connected to the inductor and an opposite end of which is connected to the short circuit unit;
   a third switch one end of which is connected to the inductor and an opposite end of which is connected to the short circuit unit; and
   a fourth switch one end of which is connected to the inductor and an opposite end of which is connected to an output.

3. The DC-DC converter of claim 2, wherein the first switch, the second switch, the third switch and the fourth switch are transistors, respectively.

4. The DC-DC converter of claim 2, wherein the reverse flow detecting unit includes:

a first reverse flow detector detecting a reverse flow of a current flowing through the second switch; and a second reverse flow detector detecting a reverse flow of a current flowing through the fourth switch.

5. The DC-DC converter of claim 2, wherein the short circuit unit includes:

a first short circuit part one end of which is connected to an input and an opposite end of which is connected to the inductor;

a second short circuit part one end of which is connected to the second switch and an opposite end of which is connected to the ground;

a third short circuit part one end of which is connected to the third switch and an opposite end of which is connected to the ground; and a fourth short circuit part one end of which is connected to the inductor and an opposite end of which is connected to an output.

6. The DC-DC converter of claim 5, wherein the first short circuit part and the fourth short circuit part are opened and the second short circuit part and the third short circuit part are short circuited, and as a buck-boost input signal is input to the topology selecting unit, the DC-DC converter is operated in a buck-boost topology.

7. The DC-DC converter of claim 5, wherein the first short circuit part and the third short circuit part are opened and the second short circuit part and the fourth short circuit part are short circuited, and as a buck input signal is input to the topology selecting unit, the DC-DC converter is operated in a buck topology.

8. The DC-DC converter of claim 5, wherein the first short circuit part, the third short circuit part and the fourth short circuit part are opened and the second short circuit part is short circuited, and as the fourth switch remains turned on, the DC-DC converter is operated in a buck topology.

9. The DC-DC converter of claim 5, wherein the first short circuit part is opened, and the second short circuit part, the third short circuit part and the fourth short circuit part are short circuited, and as the third switch remains turned off, the DC-DC converter is operated in a buck topology.

10. The DC-DC converter of claim 5, wherein the second short circuit part and the fourth short circuit part are opened and the first short circuit part and the third short circuit part are short circuited, and as a boost input signal is input to the topology selecting unit, the DC-DC converter is operated in a boost topology.

11. The DC-DC converter of claim 5, wherein the first short circuit part, the second short circuit part and the fourth short circuit part are opened and the second short circuit part, the third short circuit part and the fourth short circuit part are short circuited, and as the first switch remains turned on, the DC-DC converter is operated in a boost topology.

12. The DC-DC converter of claim 5, wherein the fourth short circuit is opened and the first short circuit part, the second short circuit part and the third short circuit part are short circuited, and as the second switch remains turned off, the DC-DC converter is operated in a boost topology.

* * * * *